US012673744B2

(12) United States Patent
    Wang

(10) Patent No.: US 12,673,744 B2
(45) Date of Patent: Jul. 7, 2026

(54) CHILDREN'S BIKE CONVERTIBLE BETWEEN PEDAL BIKE AND BALANCE BIKE

(71) Applicant: Tai-Chih Wang, Taichung City (TW)

(72) Inventor: Tai-Chih Wang, Taichung City (TW)

( * ) Notice: Subject to any disclaimer, the term of this patent is extended or adjusted under 35 U.S.C. 154(b) by 352 days.

(21) Appl. No.: 18/584,201

(22) Filed: Feb. 22, 2024

(65) Prior Publication Data

US 2025/0269929 A1      Aug. 28, 2025

(51) Int. Cl.
    B62M 3/16          (2006.01)
    B62K 9/00          (2006.01)
(52) U.S. Cl.
    CPC ................. B62M 3/16 (2013.01); B62K 9/00 (2013.01)
(58) Field of Classification Search
    CPC ............. B62M 3/16; B62K 9/00; B62K 13/00
    See application file for complete search history.

(56) References Cited

U.S. PATENT DOCUMENTS

| | | | | |
|---|---|---|---|---|
| 10,300,974 B1 * | 5/2019 | O'Reilly | ................. | B62H 7/00 |
| 12,565,279 B1 * | 3/2026 | Shi | ........................... | B62K 9/00 |

| | | | | |
|---|---|---|---|---|
| 2014/0319797 A1 * | 10/2014 | Emmons | ................ | B62M 3/003 |
| | | | | 74/594.1 |
| 2015/0047460 A1 * | 2/2015 | Torino | ................... | B62M 3/003 |
| | | | | 74/594.4 |
| 2020/0148302 A1 * | 5/2020 | Gatto | ..................... | B62K 13/00 |
| 2024/0343341 A1 * | 10/2024 | Ostergaard | .............. | B62M 1/38 |
| 2025/0319937 A1 * | 10/2025 | Rheuban | .................. | B62K 3/02 |

FOREIGN PATENT DOCUMENTS

| | | | | | |
|---|---|---|---|---|---|
| AU | 2025217326 A1 | * | 3/2026 | | |
| CN | 212637777 U | * | 3/2021 | | |
| CN | 112874686 A | * | 6/2021 | .............. | B62M 3/00 |
| CN | 118560617 A | * | 8/2024 | .............. | B62K 9/00 |
| FR | 2930929 A1 | * | 11/2009 | .............. | B62B 7/12 |

* cited by examiner

*Primary Examiner* — Drew J Brown
(74) *Attorney, Agent, or Firm* — RABIN & BERDO, P.C.

(57)                    ABSTRACT

A children's bike convertible between a pedal bike and a balance bike has a bike frame, two pedal components, and a quick release assembly. Each pedal component has a crank, a tube connected to a side of the crank, and a pedal connected to the other side of the crank. The tube is inserted into a bottom bracket of the bike frame. The quick release assembly is mounted through the tube of one of the two pedal components and connected to the tube of the other one of the two pedal components. By mounting the quick release assembly to fix the two pedal components to the bike frame, the children's bike can be used as a pedal bike. After detaching the quick release assembly, the two pedal components can be detached from the bike frame to convert the children's bike to a balance bike.

19 Claims, 12 Drawing Sheets

CHILDREN'S BIKE CONVERTIBLE BETWEEN PEDAL BIKE AND BALANCE BIKE

BACKGROUND

1. Field of the Invention

The present invention relates to a bike, and particularly to a children's bike convertible between a pedal bike and a balance bike.

2. Description of Related Art

A balance bike is normally for children in preschool stage. The balance bike lacks pedals, which allows children to keep their feet on the ground for training their senses of balance and the muscles of their feet and legs.

Still, as a main goal, the children have to practice pedaling in the end, so parents need to prepare both the balanced bike and a pedal bike, which not only costs more but also occupies more space in the household.

To overcome the aforementioned problems, the present invention tends to provide a children's bike convertible between a pedal bike and a balance bike to mitigate or obviate the aforementioned problems.

SUMMARY

The main objective of the present invention is to provide a children's bike convertible between a pedal bike and a balance bike that can be converted between a pedal bike and a balance bike.

The children's bike convertible between a pedal bike and a balance bike has a bike frame, a chain assembly, two pedal components, and a quick release assembly. The bike frame has a bottom bracket. The chain assembly is mounted on the children's bike frame. The two pedal components are detachably disposed on the bike frame and connected to a chain assembly of the children's bike; each one of the two pedal components has a crank, a tube, and a pedal. The crank has two opposite ends. The tube is connected to one of the two opposite ends of the crank and is inserted into the bottom bracket. The pedal is connected to the other one of the two opposite ends of the crank. The quick release assembly has a rod and a handle connected to the rod. The rod is detachably mounted through the tube of one of the two pedal components and connected to the tube of the other one of the two pedal components so as to fix the two pedal components on the bottom bracket.

Other objectives, advantages and novel features of the invention will become more apparent from the following detailed description when taken in conjunction with the accompanying drawings.

DETAILED DESCRIPTION OF PREFERRED EMBODIMENTS

Figure 1:
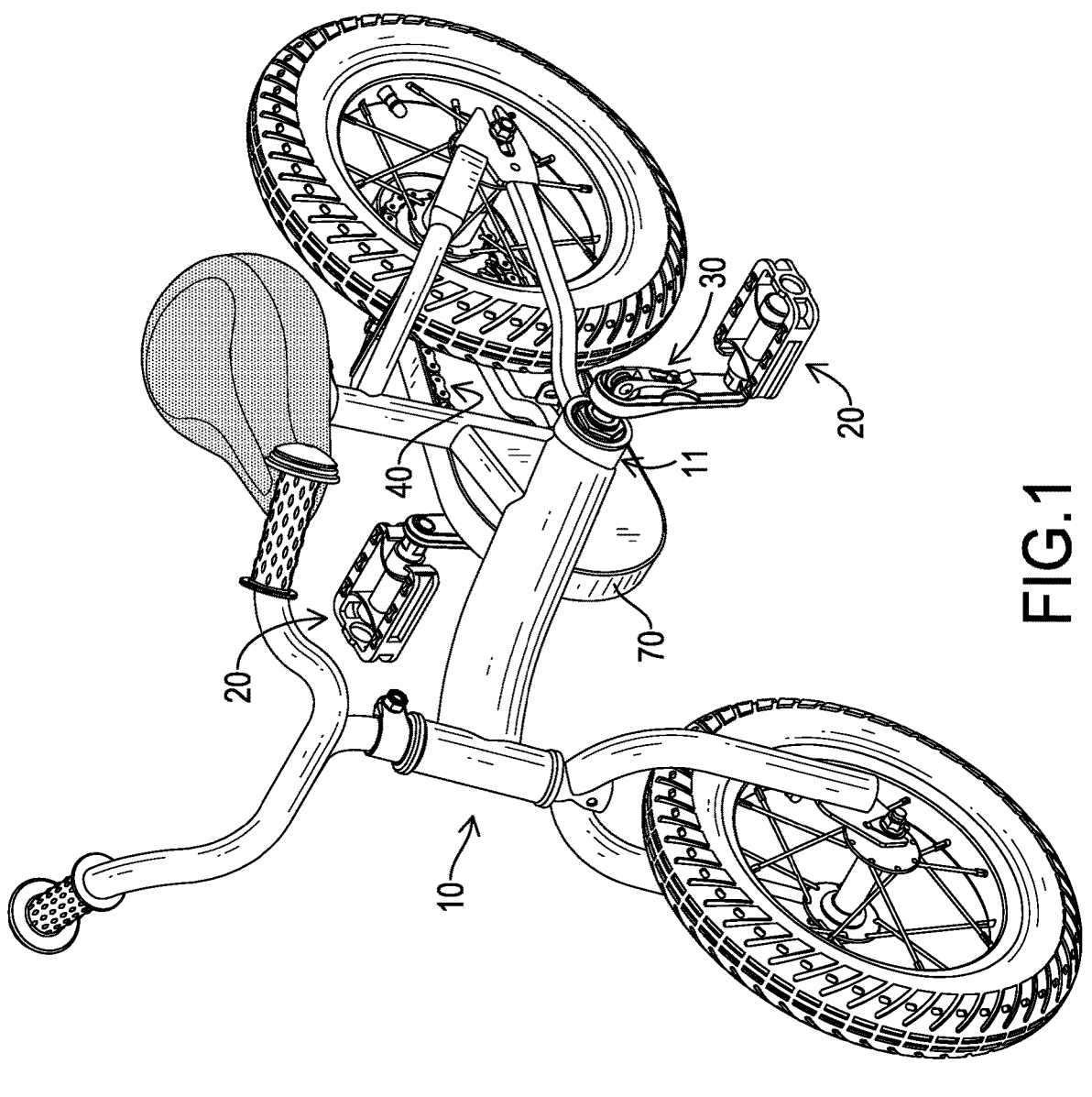
FIG. 1 is a perspective view of a first preferred embodiment of a children's bike convertible between a pedal bike and a balance bike in accordance with the present invention.

With reference to FIG. 1, a first preferred embodiment of a children's bike convertible between a pedal bike and a balance bike in accordance with the present invention has a bike frame 10, two pedal components 20, and a quick release assembly 30. The two pedal components 20 are disposed to the bike frame 10, and the quick release assembly 30 allows the two pedal components 20 to be fixed to or detached from the bike frame 10.

Figure 2:
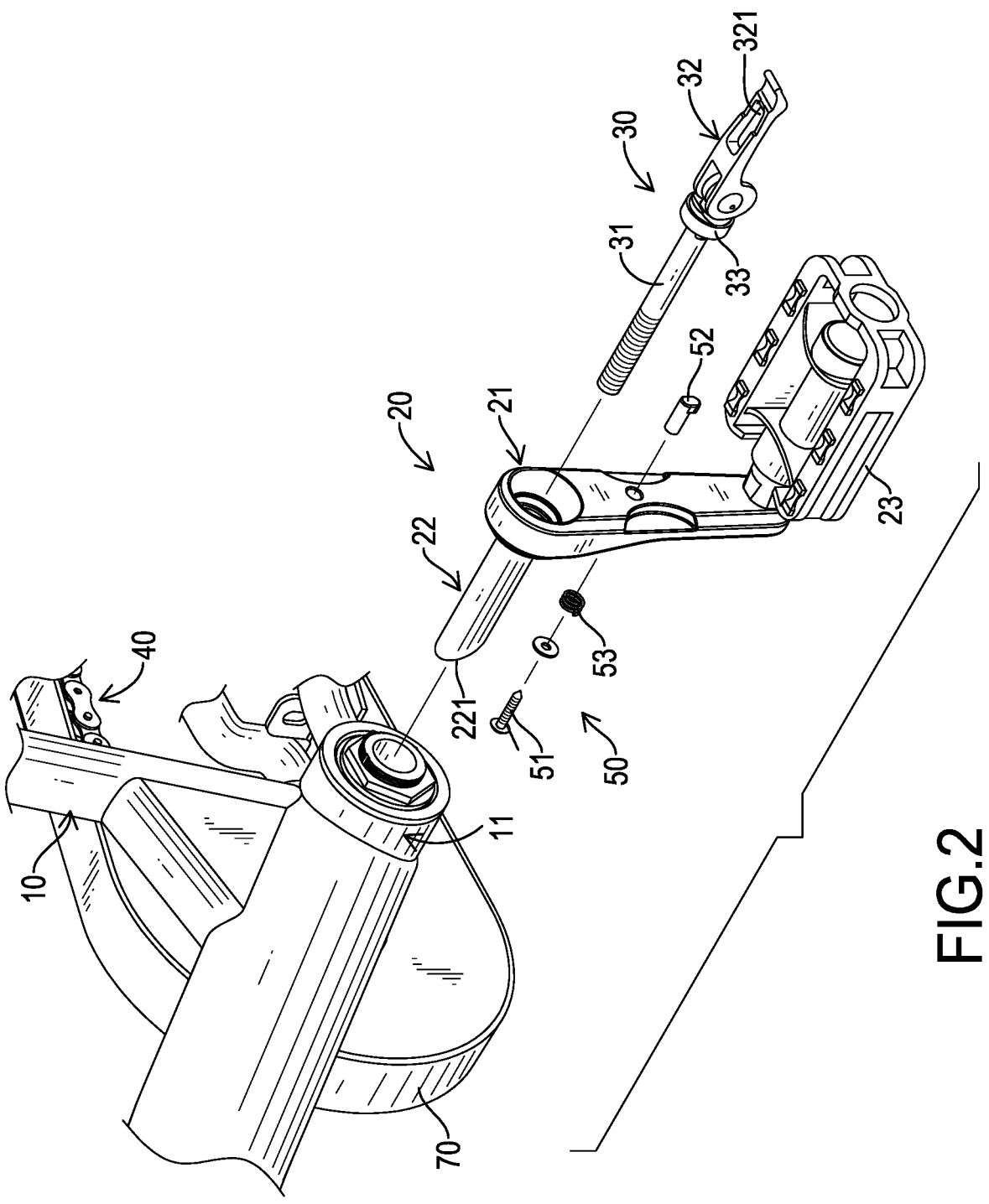
FIG. 2 is an exploded view of one of two pedal components of the children's bike in FIG. 1.
Figure 3:
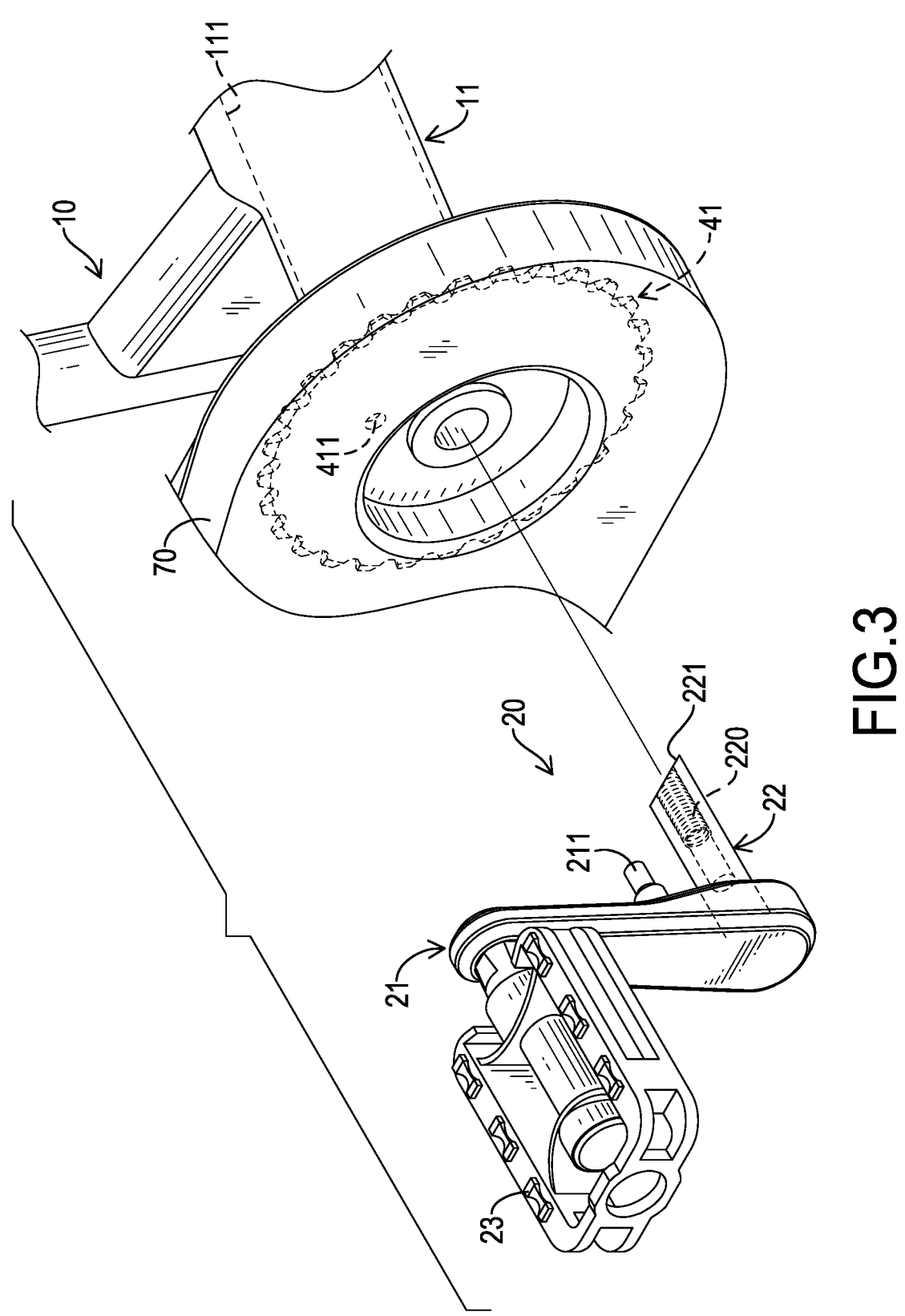
FIG. 3 is an exploded view of the other one of the two pedal components of the children's bike in FIG. 1.
Figure 4:
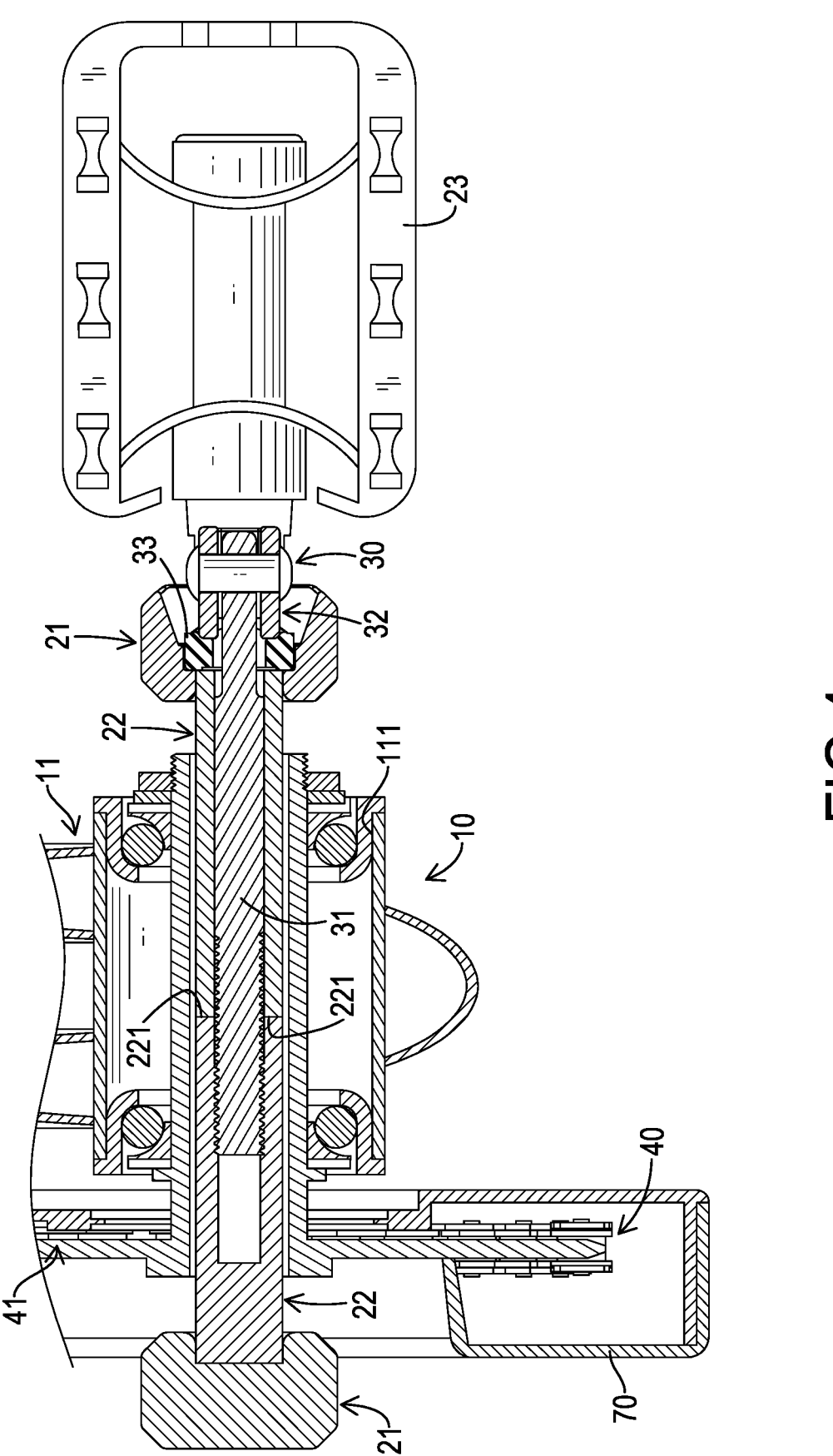
FIG. 4 is a partial sectional top side view of the children's bike in FIG. 1.
Figure 5:
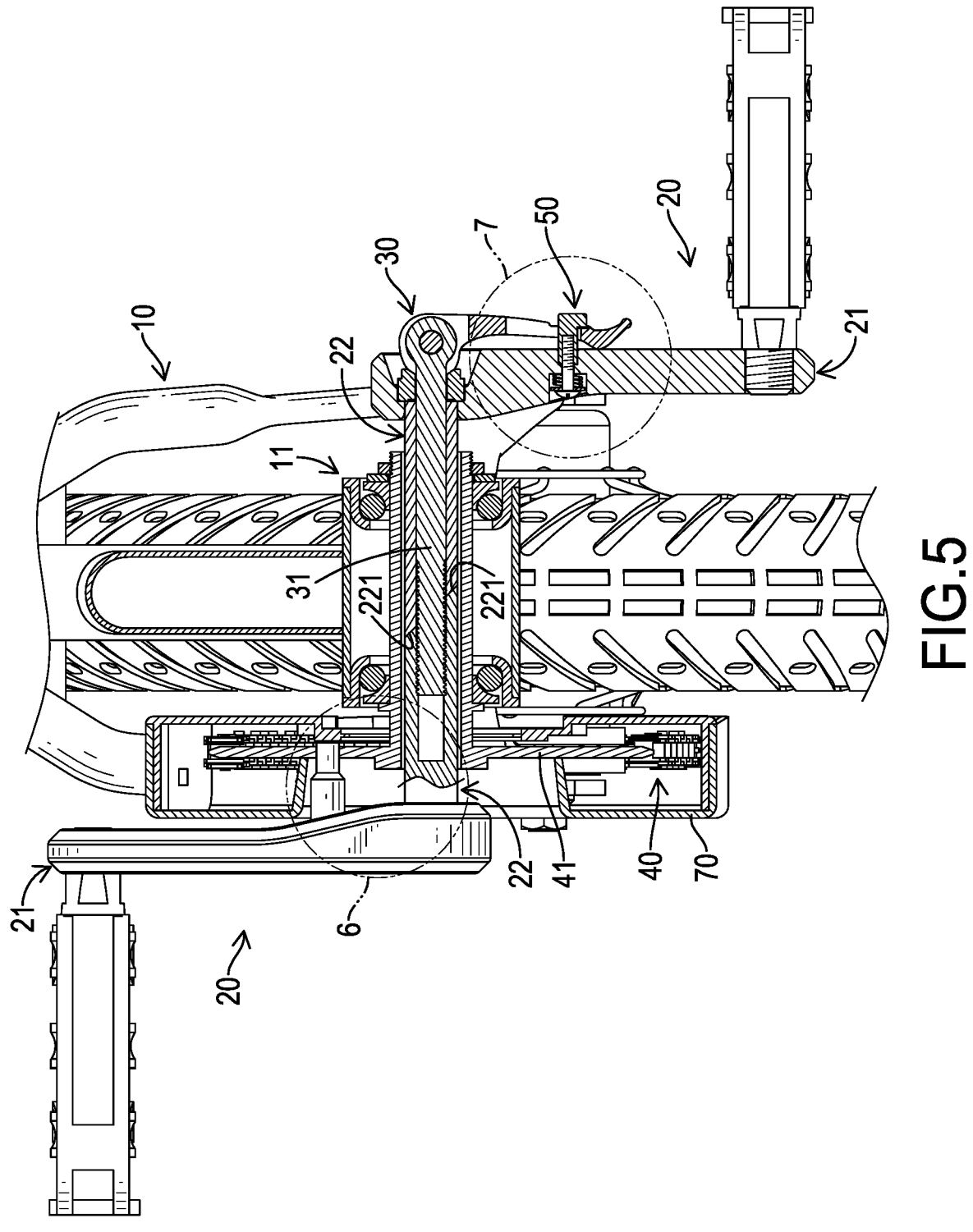
FIG. 5 is a partial sectional side view of the children's bike in FIG. 1.

With reference to FIG. 1, the bike frame 10 is the main support of the children's bike, and the children's bike has a handle bar, two wheels, a saddle, and a chain assembly 40 mounted on the bike frame 10. With reference to FIGS. 1 to 3, the bike frame 10 has a bottom bracket 11 for mounting the two pedal components 20, and the bottom bracket 11 has a through hole 111. With reference to FIGS. 4 and 5, the through hole 111 has two bearings disposed therein, and the chain assembly 40 has a chainring 41 rotatably disposed on the bike frame 10 and having a ring body and a cylinder portion connected to the ring body; the ring body is configured for transmission with at least one chain of the chain assembly 40, and the cylinder portion is mounted through the through hole 111 and to the two bearings.

With reference to FIGS. 4 and 5, the two pedal components 20 are disposed to the bike frame 10 from two opposite sides. With reference to FIGS. 2 to 5, each one of the two pedal components 20 has a crank 21, a tube 22, and a pedal 23. The crank 21 has two opposite ends, and the tube 22 and the pedal 23 are respectively connected to the two opposite ends of the crank 21; specifically, the tube 22 and the crank 21 are connected to each other by welding. With reference to FIGS. 4 and 5, said tubes 22 of the two pedal components 20 are inserted into the bottom bracket 11, and specifically inserted into the cylinder portion of the chainring 41 mounted through the through hole 111 of the bottom bracket 11.

Figure 6:
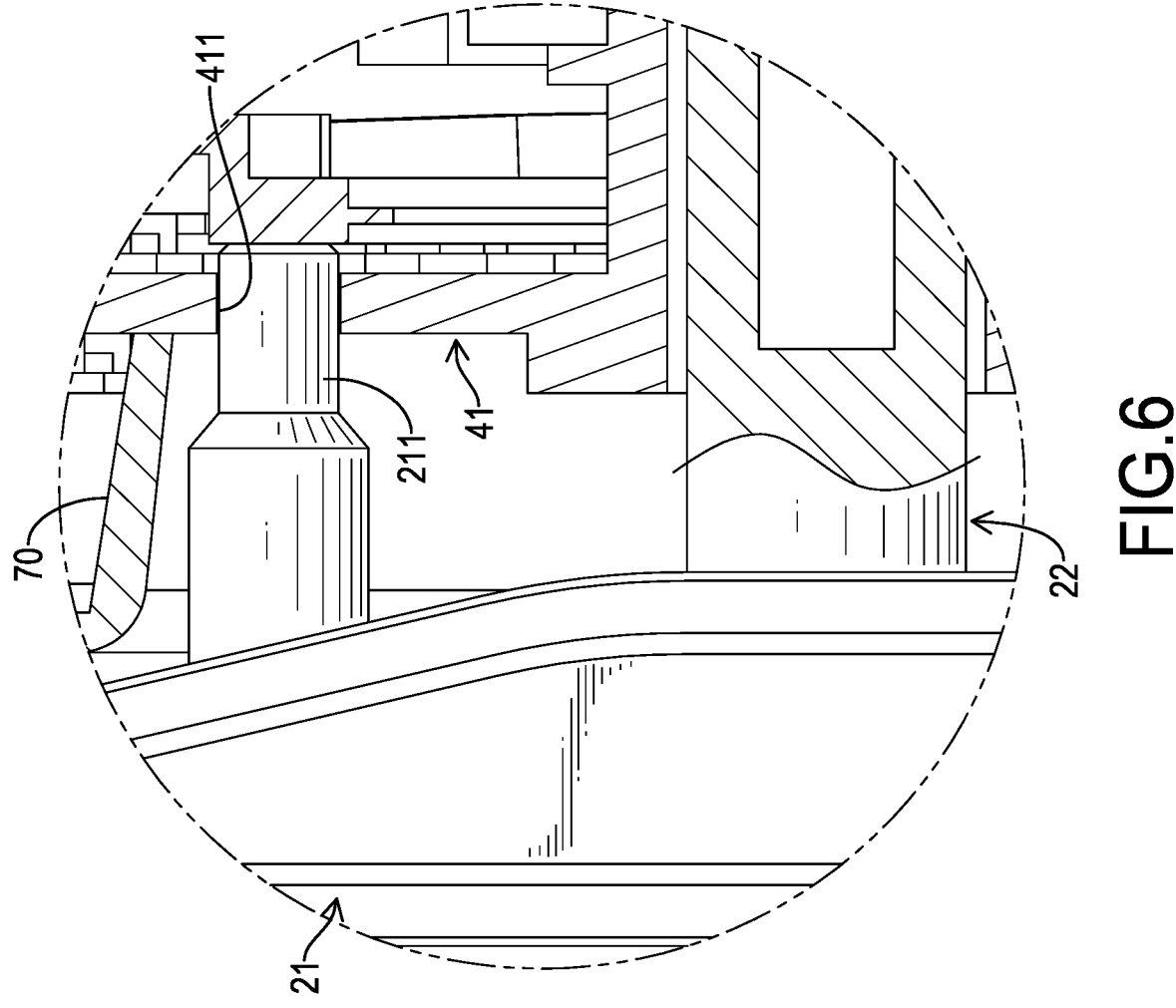
FIG. 6 is an enlarged view of an encircled area 6 in FIG. 5.

With reference to FIGS. 3, 5, and 6, the two pedal components 20 are connected to the chainring 41 of the chain assembly 40. Specifically, in the first preferred embodiment, the children's bike has a restricting mechanism having a pin 211 and a connecting hole 411. The pin 211 protrudes from the crank, and the connecting hole 411 is defined on the ring body of the chainring 41. The pin 211 is inserted into the connecting hole 411 on the chainring 41 such that the chainring 41 rotates as the pedal 23 rotates when pedaling.

In other embodiments, the two pedal components 20 may be connected to the chainring 41 by other construction; e.g., the pin 211 may be formed on the chainring 41 with the connecting hole 411 formed on the crank 21, or the tube 22 and the cylinder portion of the chainring 41 may respectively have a key and a keyway to be connected to each other. As long as the children's bike has the restricting mechanism connected between the chainring 41 and the crank 21 to allow the chainring 41 and the two pedal components 20 to rotate synchronously, the configuration of the chainring 41 is not limited to the first preferred embodiment.

With reference to FIG. 2, the quick release assembly 30 has a rod 31 and a handle 32. The rod 31 has an external thread formed on an end of the rod, and the handle 32 is connected to the other end of the rod 31. With reference to FIGS. 4 and 5, the rod 31 is mounted through the tube 22 of one of the two pedal components 20 and connected to the tube 22 of the other one of the two pedal components 20; specifically, the external thread allows the rod 31 to be screwed with the corresponding cylinder 22.

Also, with reference to FIGS. 2 and 3, in the first preferred embodiment, the tube 22 of each one of the two pedal components 20 has an inclined surface 221 formed on an end of the tube 22; with reference to FIGS. 4 and 5, the inclined surface 221 completely abuts said inclined surface 221 of the tube 22 of the other one of the two pedal components 20. Thereby, the two pedal components 20 are configured to rotate synchronously even though the rod 31 of the quick release assembly 30 is only mounted through the tube 22 of one of the two pedal components 20 and connected to the tube 22 of the other one of the two pedal components 20.

With the quick release assembly 30, the two pedal components 20 are configured to be fixed to the bike frame 10 and be connected to the chain assembly 40. The children's bike can be used as a pedal bike; i.e. a rider can ride the children's bike to move forward by pedaling.

Specifically, with reference to FIG. 5, in the first preferred embodiment, the handle 32 is pivotally connected to the rod 31 and has a cam portion, and the quick release assembly 30 has a cap 33 disposed on the rod 31 and having a recess corresponding to the cam portion of the handle 32. The cam portion of the handle 32 is configured to be engaged with the recess of the cap 33 to limit pivoting of the handle 32, which prevents the handle 32 from inadvertently driving the rod 31 to rotate and be detached from the tube 22 of the two pedal components 20. The cam portion of the handle 32 and the cap 33 in the quick release assembly 30 are conventional and thus are not specifically described here.

Figure 7:
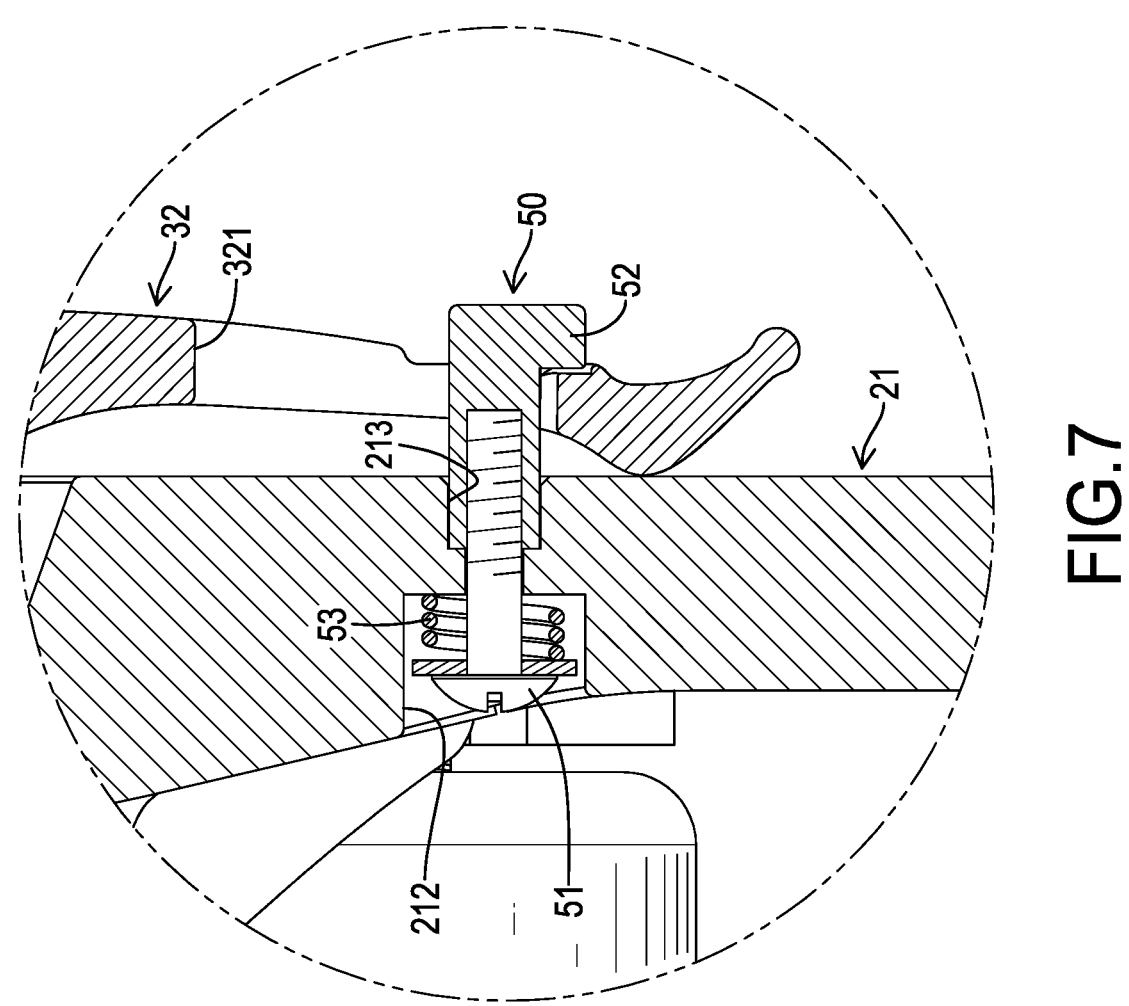
FIG. 7 is an enlarged view of an encircled area 7 in FIG. 5.
Figure 8:
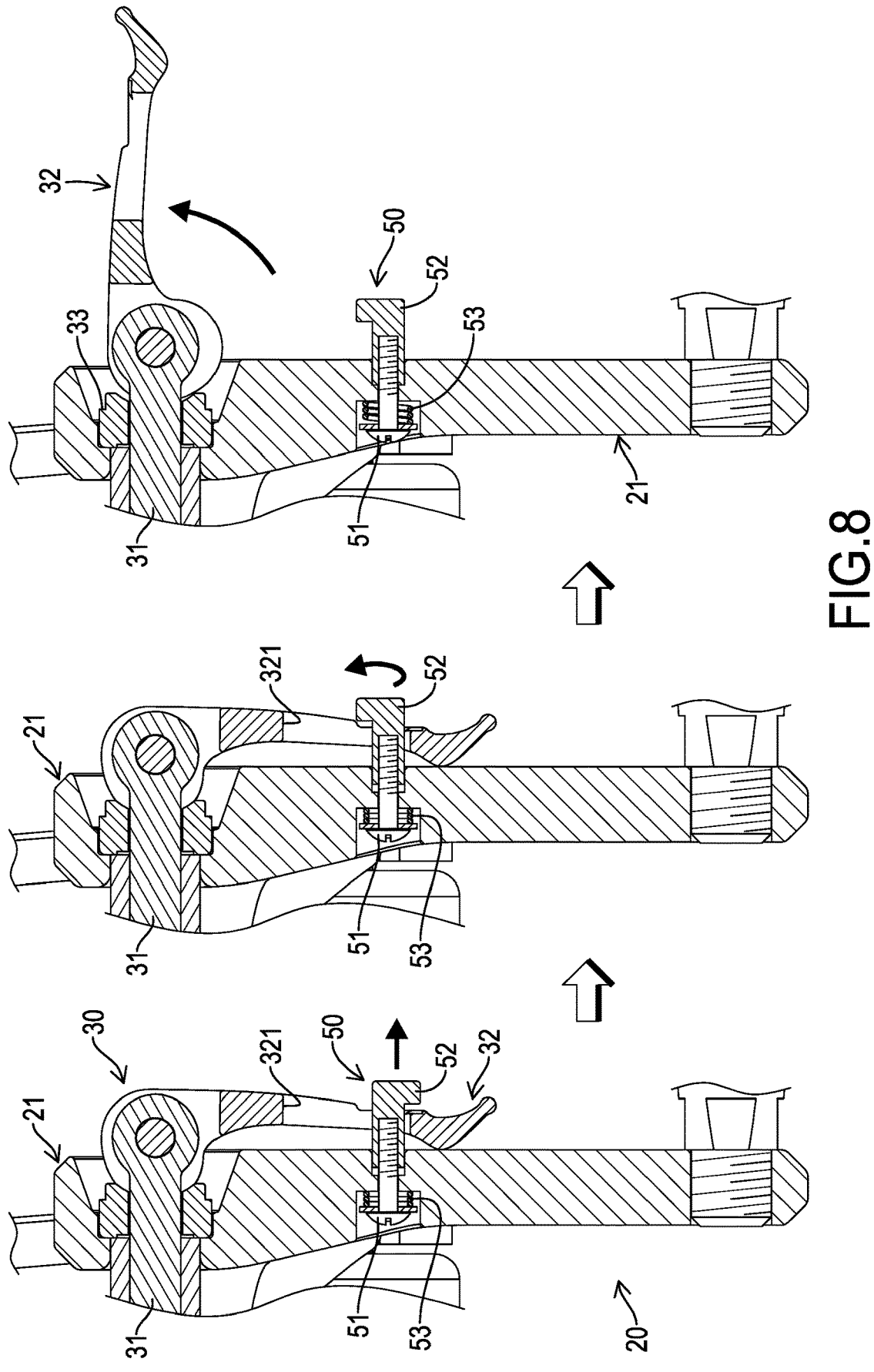
FIG. 8 is an operational view of a positioning component of the children's bike in FIG. 1.

Further, with reference to FIG. 2, in the first preferred embodiment, the children's bike has a positioning component 50. The positioning component 50 has a connecting bolt 51, an engaging unit 52, and an elastic element 53. With reference to FIGS. 7 and 8, the connecting bolt 51 is movably mounted through the crank 21 of one of the two pedal components 20, and the engaging unit 52 is connected to the connecting bolt 51; the elastic element 53 is disposed between the crank 21 and the connecting bolt 51.

Specifically, in the first preferred embodiment, the crank 21 has a groove 212 recessed on a side of the crank 21 and an extending hole 213 extending from the groove 212 to the other side of the crank 21. The connecting bolt 51 is disposed in the groove 212 and is mounted through the extending hole 213 to be connected to the engaging unit 52.

The elastic element 53 is specifically a compression spring, and two opposite ends of the elastic element 53 respectively abut against a bottom of the groove 213 and the bolt head of the connecting bolt 51.

With reference to FIG. 7, the elastic element 53 is configured to provide an elastic force to actuate the connecting bolt 51 and the engaging unit 52 such that the engaging unit 52 moves toward the crank 21 and is tightly engaged with the handle 32 of the quick release assembly 30 to secure the handle 32 on the crank 21. Specifically, in the first preferred embodiment, the handle 32 has an elongated hole 321, and the engaging unit 52 is mounted through the elongated hole 321 and is engaged with an edge of the elongated hole 321.

By the elasticity of the elastic element 53, the engaging unit 52 is configured to secure the handle 32 on the crank 21, which further prevents the handle 32 from inadvertently driving the rod 31 to be detached from said tubes 22 of the two pedal components 20. The two pedal components 20 can be stably fixed to the bike frame 10 when the children's bike is used as a pedal bike.

When trying to convert the children's bike to a balance bike, the positioning component 50 needs to be unlocked first. With reference to the left part of FIG. 8, first, the engaging unit 52 needs to be pulled away from the crank 21, and the connecting bolt 51 is actuated to compress the elastic element 53 at the same time; then, the engaging unit 52 can be rotated as shown in the middle part of FIG. 8 to release the handle 32 and configured to pass through the elongated hole 321; last, the handle 32 can be pivoted relative to the rod 31 to disengage the cam portion of the handle 32 from the recess of the cap 33. Afterwards, the handle 32 is operable to drive the rod 31 to be detached from said tubes 22 as shown in FIG. 9.

Figure 9:
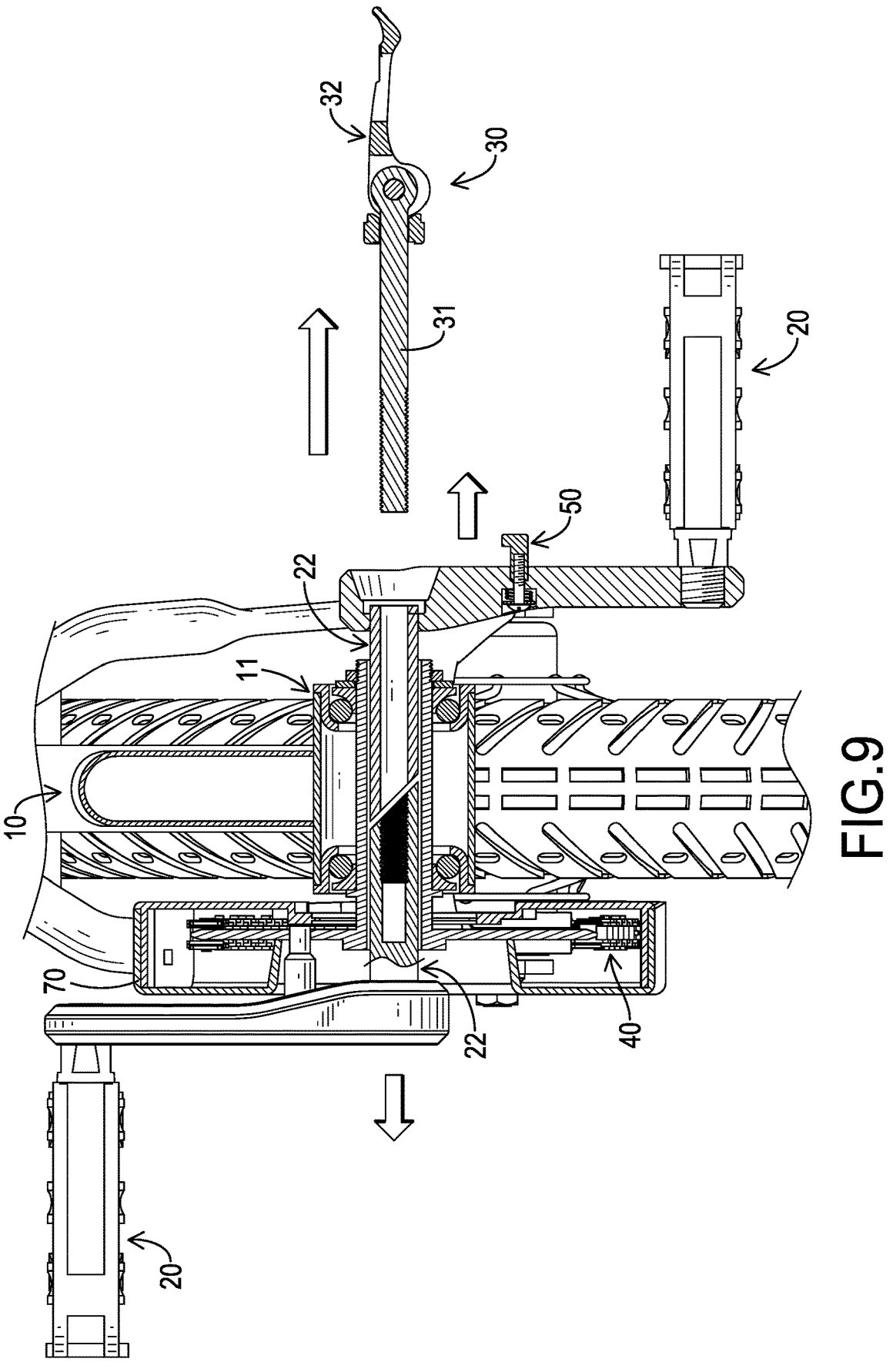
FIG. 9 is an operational view of a quick release assembly and the two pedal components of the children's bike in FIG. 1 being detached.
Figure 10:
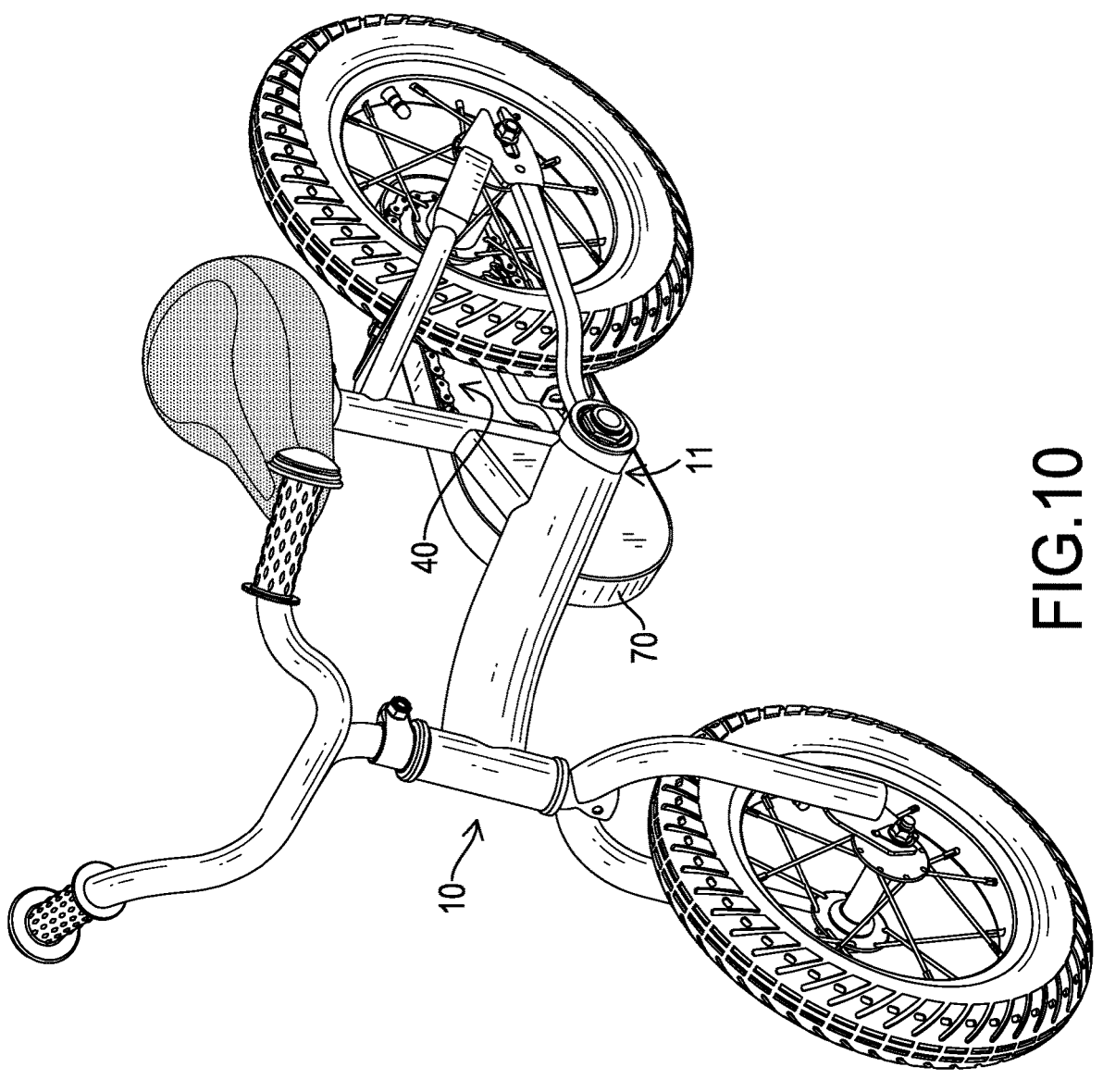
FIG. 10 is a perspective view of the children's bike in FIG. 1 converted to a balance bike.

With reference to FIG. 9, after the quick release assembly 30 is detached, the two pedal components 20 can also be withdrawn from the bottom bracket 11 of the bike frame 10 from two opposite sides. With reference to FIG. 10, finally, the children's bike after detaching the two pedal components 20 is converted to the balance bike for children to ride with their feet on the ground.

With reference to FIGS. 1, 3 to 5, and 10, the children's bike further has a chainguard 70, and the chainguard 70 covers around the chain assembly 40 having the chainring 41, at least one chain, and other components. When the children's bike is converted to the balance bike as shown in FIG. 10, the chainguard 70 prevents children's feet from contacting the chain assembly 40, which improves safety in use.

Figure 11:
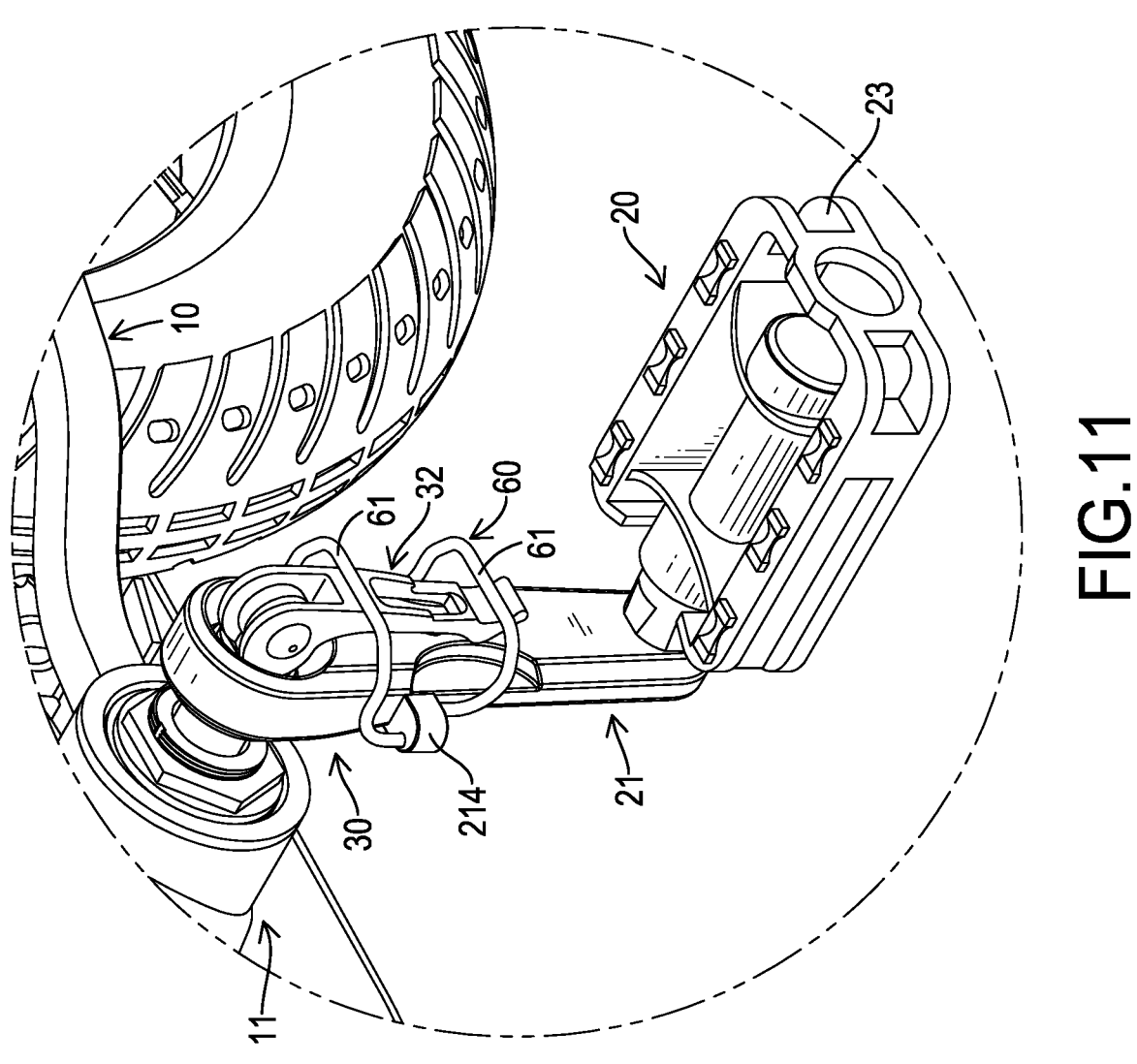
FIG. 11 is an enlarged perspective view of a second preferred embodiment of the children's bike convertible between a pedal bike and a balance bike in accordance with the present invention.

FIG. 11 shows a second preferred embodiment of the children's bike in accordance with the present invention. The difference between the second preferred embodiment and the first preferred embodiment is that the children's bike in the second preferred embodiment has a limiting structure 60 instead of the positioning component 50.

Figure 12:
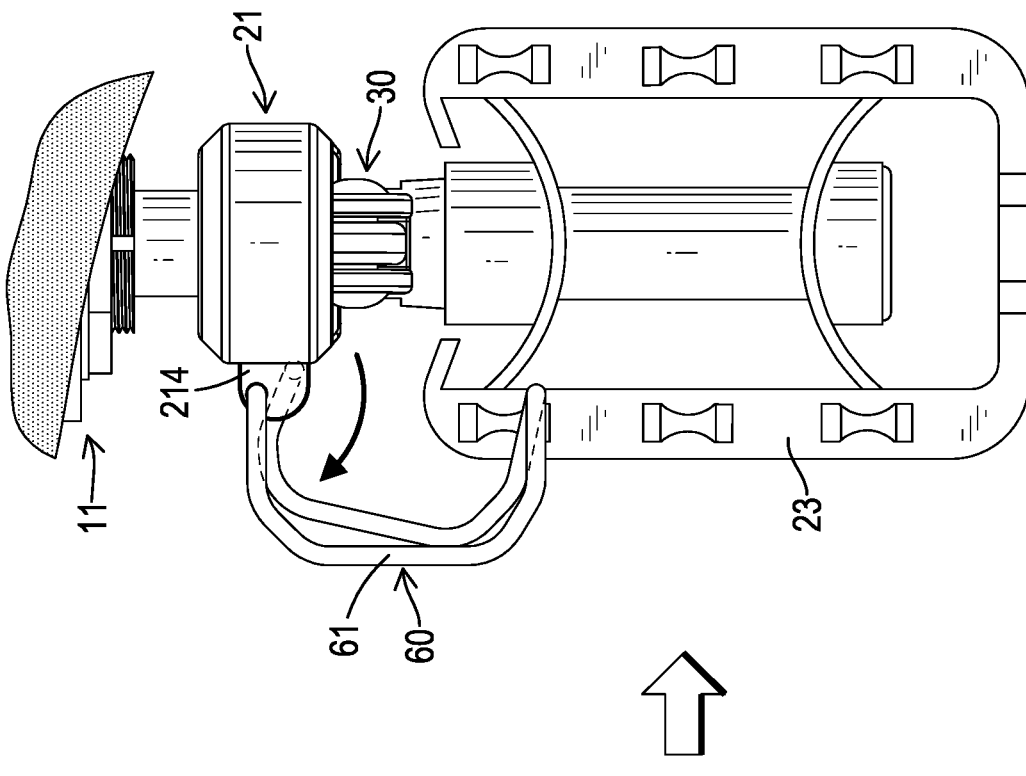
FIG. 12 is an operational top side view of a limiting structure of the children's bike in FIG. 11.
Figure 12:
Figure 12:
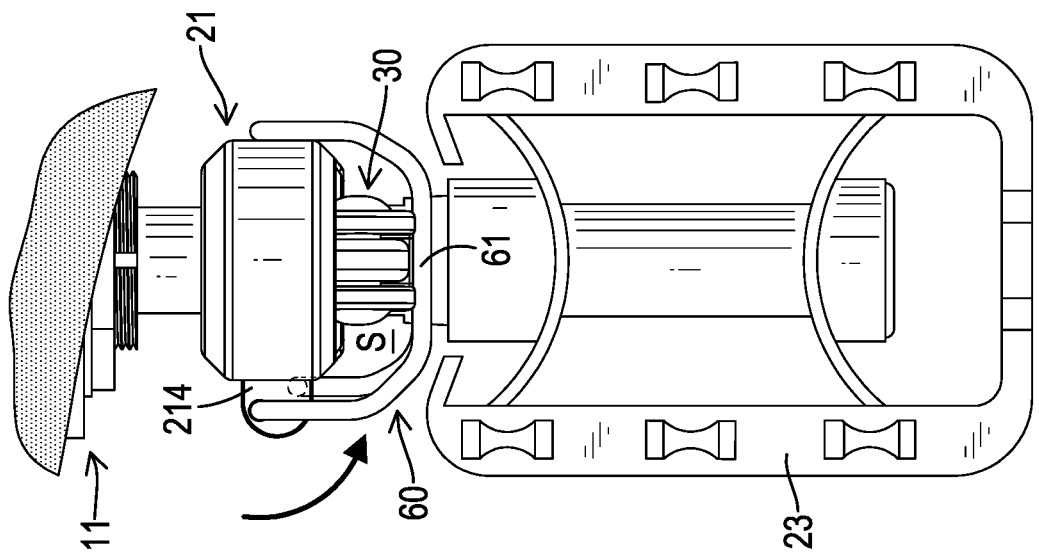

With reference to FIGS. 11 and 12, specifically, the limiting structure 60 is formed by a bended metal wire, is elastic, and has two limiting sections 61, and the crank 21 of one of the two pedal components 20 has a protruding portion 214 protruding from a side of the crank 21. Two opposite ends of the bended metal wire are connected to the protruding portion 214 at different positions. By the elasticity of the metal wire, the limiting structure 60 is swingable relative to the crank 21. The two limiting sections 61 are spaced from each other, and one of the two limiting sections 61 is located above the other one of the two limiting sections 61.

With reference to the left part of FIG. 12, after mounting the quick release assembly 30 to fix the two pedal components 20 to the bike frame 10, the limiting structure 60 can be swung toward and be engaged with the other side of the crank 21 away from the protruding portion 214 such that a space S is formed between the limiting structure 60 and the crank 21. The handle 32 of the quick release assembly 30 is limited in the space S mentioned above by the two limiting sections 61 of the limiting structure 60 as shown in FIG. 11 and thus cannot drive the rod 31 to be detached from the two pedal components 20. Thus, the limiting structure 60 has a similar utility to the positioning component 50 in the first preferred embodiment to prevent the quick release assembly 30 from inadvertently detachment.

With reference to the right part of FIG. 12, when trying to convert the children's bike to the balance bike, a user can pry and swing the limiting structure 60 to disengage the limiting structure 60 from the other side of the crank 21 via a hand tool. Afterwards, the handle 32 of the quick release assembly 30 is free to be operated; thereby, the rod 31 can be detached from said tubes 22 of the two pedal components 20, and then the two pedal components 20 can be detached from the bike frame 10. The children's bike can thus be converted to the balance bike from the pedal bike.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A children's bike convertible between a pedal bike and a balance bike, and the children's bike comprising:
    a bike frame having a bottom bracket;
    a chain assembly mounted on the bike frame;
    two pedal components detachably disposed on the bottom bracket and connected to the chain assembly, and each one of the two pedal components having
        a crank having two opposite ends;
        a tube connected to one of the two opposite ends of the crank and inserted into the bottom bracket; and
        a pedal connected to the other one of the two opposite ends of the crank; and
    a quick release assembly having
        a rod detachably mounted through the tube of one of the two pedal components and connected to the tube of the other one of the two pedal components so as to fix the two pedal components on the bottom bracket; and
        a handle connected to the rod.

2. The children's bike convertible between a pedal bike and a balance bike as claimed in claim 1, wherein the tube of each one of the two pedal components has an inclined surface formed on an end of the tube and abutting against said inclined surface of the tube of the other one of the two pedal components.

3. The children's bike convertible between a pedal bike and a balance bike as claimed in claim 2, wherein
    the chain assembly has a chainring rotatably mounted on the bottom bracket; and
    the children's bike has a restricting mechanism connected between the chainring and the crank of one of the two pedal components.

4. The children's bike convertible between a pedal bike and a balance bike as claimed in claim 1, wherein
    the children's bike has a positioning component having
        a connecting bolt movably mounted through the crank of one of the two pedal components;
        an engaging unit connected to the connecting bolt; and
        an elastic element disposed between the crank and the connecting bolt and configured to provide elastic force to actuate the connecting bolt and the engaging unit such that the engaging unit is engaged with the handle and secure the handle on the crank.

5. The children's bike convertible between a pedal bike and a balance bike as claimed in claim 2, wherein
    the children's bike has a positioning component having
        a connecting bolt movably mounted through the crank of one of the two pedal components;
        an engaging unit connected to the connecting bolt; and
        an elastic element disposed between the crank and the connecting bolt and configured to provide elastic force to actuate the connecting bolt and the engaging unit such that the engaging unit is engaged with the handle and secure the handle on the crank.

6. The children's bike convertible between a pedal bike and a balance bike as claimed in claim 3, wherein
    the children's bike has a positioning component having
        a connecting bolt movably mounted through the crank of one of the two pedal components;
        an engaging unit connected to the connecting bolt; and
        an elastic element disposed between the crank and the connecting bolt and configured to provide elastic force to actuate the connecting bolt and the engaging unit such that the engaging unit is engaged with the handle and secure the handle on the crank.

7. The children's bike convertible between a pedal bike and a balance bike as claimed in claim 4, wherein
    the handle of the quick release assembly has an elongated hole;
    the engaging unit is mounted through the elongated hole, is engaged with the handle, and is configured to rotate relative to the crank to release the handle.

8. The children's bike convertible between a pedal bike and a balance bike as claimed in claim 5, wherein
    the handle of the quick release assembly has an elongated hole;
    the engaging unit is mounted through the elongated hole, is engaged with the handle, and is configured to rotate relative to the crank to release the handle.

9. The children's bike convertible between a pedal bike and a balance bike as claimed in claim 6, wherein
    the handle of the quick release assembly has an elongated hole;
    the engaging unit is mounted through the elongated hole, is engaged with the handle, and is configured to rotate relative to the crank to release the handle.

10. The children's bike convertible between a pedal bike and a balance bike as claimed in claim 4, wherein
    the crank of the pedal component corresponding to the positioning component has
        a groove recessed on one of two opposite sides of the crank; and
        an extending hole extending from the groove to the other one of the two opposite sides of the crank;
    the connecting bolt has a bolt head disposed in the groove and is mounted through the extending hole to be connected to the engaging unit; and the elastic element has two opposite ends respectively abutting against a bottom of the groove and the bolt head of the bolt.

11. The children's bike convertible between a pedal bike and a balance bike as claimed in claim 5, wherein the crank of the pedal component corresponding to the positioning component has a groove recessed on one of two opposite sides of the crank; and an extending hole extending from the groove to the other one of the two opposite sides of the crank;

the connecting bolt has a bolt head disposed in the groove and is mounted through the extending hole to be connected to the engaging unit; and the elastic element has two opposite ends respectively abutting against a bottom of the groove and the bolt head of the bolt.

12. The children's bike convertible between a pedal bike and a balance bike as claimed in claim 6, wherein the crank of the pedal component corresponding to the positioning component has a groove recessed on one of two opposite sides of the crank; and an extending hole extending from the groove to the other one of the two opposite sides of the crank;

the connecting bolt has a bolt head disposed in the groove and is mounted through the extending hole to be connected to the engaging unit; and the elastic element has two opposite ends respectively abutting against a bottom of the groove and the bolt head of the bolt.

13. The children's bike convertible between a pedal bike and a balance bike as claimed in claim 1, wherein the children's bike has a limiting structure swingably connected to the crank of one of the two pedal components for limiting the handle between the limiting structure and the crank.

14. The children's bike convertible between a pedal bike and a balance bike as claimed in claim 2, wherein the children's bike has a limiting structure swingably connected to the crank of one of the two pedal components for limiting the handle between the limiting structure and the crank.

15. The children's bike convertible between a pedal bike and a balance bike as claimed in claim 3, wherein the children's bike has a limiting structure swingably connected to the crank of one of the two pedal components for limiting the handle between the limiting structure and the crank.

16. The children's bike convertible between a pedal bike and a balance bike as claimed in claim 13, wherein the limiting structure is formed by a bended metal wire and has two limiting sections spaced from each other; and the handle is limited by the two limiting sections.

17. The children's bike convertible between a pedal bike and a balance bike as claimed in claim 14, wherein the limiting structure is formed by a bended metal wire and has two limiting sections spaced from each other; and the handle is limited by the two limiting sections.

18. The children's bike convertible between a pedal bike and a balance bike as claimed in claim 15, wherein the limiting structure is formed by a bended metal wire and has two limiting sections spaced from each other; and the handle is limited by the two limiting sections.

19. The children's bike convertible between a pedal bike and a balance bike as claimed in claim 1, wherein the children's bike has a chainguard covering around the chain assembly.

* * * * *